July 27, 1954
E. E. LITKENHOUS
2,684,495
PORTABLE IMPLEMENT
Filed Nov. 22, 1950
2 Sheets-Sheet 1
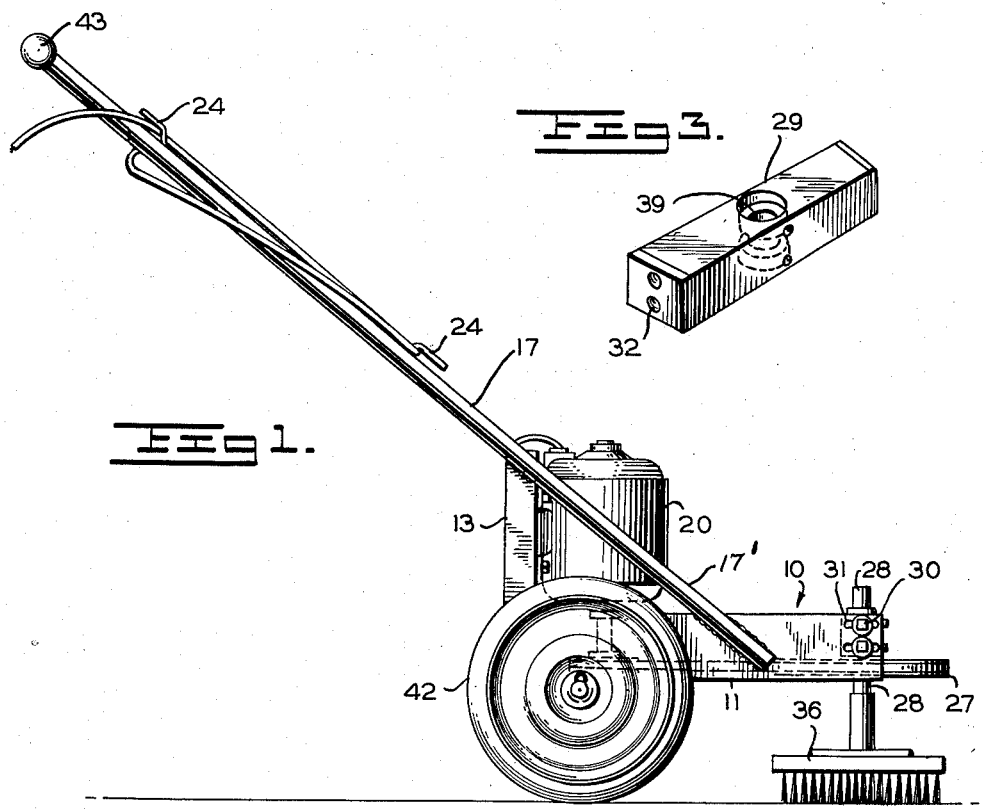
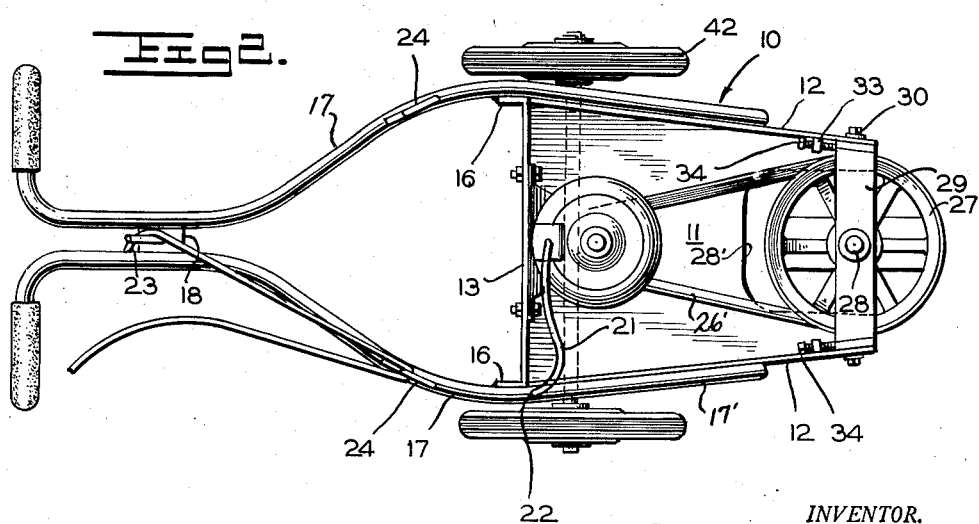
INVENTOR.
EDWARD E. LITKENHOUS
BY
Cushman, Darby & Cushman
ATTORNEYS

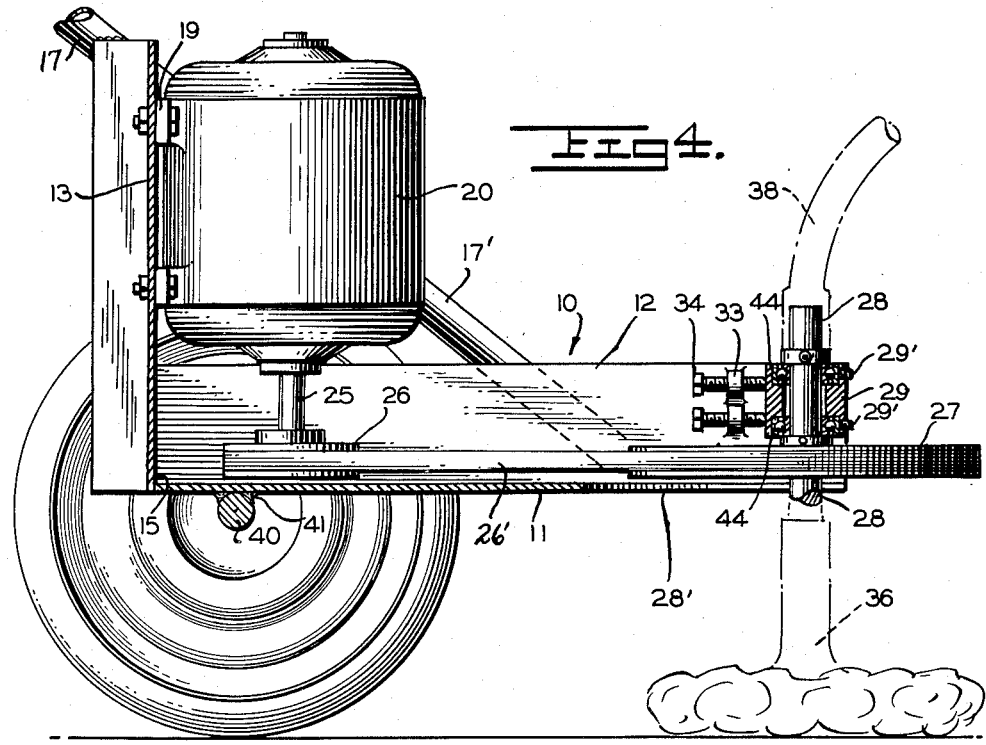
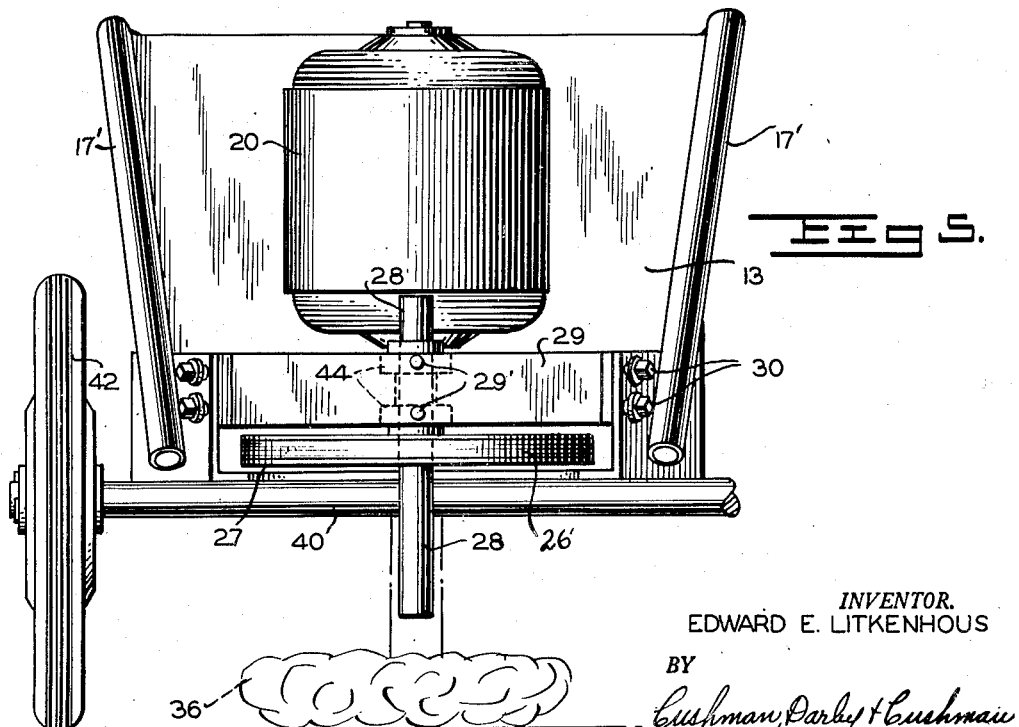

Patented July 27, 1954

2,684,495

UNITED STATES PATENT OFFICE 2,684,495

PORTABLE IMPLEMENT

Edward Earl Litkenhous, Nashville, Tenn.

Application November 22, 1950, Serial No. 196,987

1 Claim. (Cl. 15—49)

The present invention relates to a portable rotary implement having a multiplicity of uses, among which may be mentioned scrubbing and polishing, earth working, cutting, as for instance grass, as well as cultivating, and which may also be used as a power takeoff for the operation of various domestic metal and wood working devices.

The principal object of this invention is to provide a machine in which efficient operation characteristics as a polishing, scrubbing, cutting or earth working device will be obtained, and in which the machine may also be utilized as a convenient source of stationary power for operating hand tools or the like.

Another object of this invention is to provide a machine design giving operating versatility to the driven implement. When working soil the depth of the cut is regulated by the raising or the lowering of the handle thereby giving versatility to the front end of the machine frame, the frame acting as a lever fulcrumed around the axle. Additionally, substantially greater force may be applied to the implement by lifting the machine wheels from the supporting surface and distributing a portion of the machine weight to the implement end of the frame.

Another object of this invention is to provide a simple construction containing relatively few parts which will be light in weight and which can be readily traveled from one location to another.

I have illustrated in the accompanying drawings a preferred embodiment and it is to be understood that modifications thereof may be made without departing from the general scope of the invention.

Referring to the drawings:

Figure 1 is a side elevation;

Figure 2 is a top plan;

Figure 3 is a perspective view of a block forming part of the supporting structure for the operating instrumentality;

Figure 4 is a side elevation partly broken away with some of the parts in section; and Figure 5 is a front elevation.

Referring to Figure 1, the construction includes a frame 10 having a bottom 11, integral upstanding sides 12 and an upstanding rear end frame 13 welded to the supporting frame 10 as shown at 15 so as to provide a thoroughly rigid structure. Connected to the sides 12 of the lower frame 10, and to rearwardly turned flanges 16 of the end frame 13, as by welding or bolts, are hollow or tubular handles 17. These handles are joined at their upper ends by a suitable connecting member or web 18 which is preferably welded at its side edges to the adjacent handle portions. Also, the lower portion of the handles 17', extending between the points of connection to the machine frames, serve as a strengthening member to rigidly maintain the frames 10 and 13 in their proper relation.

Mounted on the end frame 13 as shown in Figure 4 by suitable brackets 19 is an electric motor 20, the power for which is carried by the cord 21 connected at one end to the motor, as shown in Figures 1 and 2, having a substantial portion of its length threaded into one of the hollow pipe-like handles 17, as shown at 22 in Figure 2. The electrical cord emerges from the handle as shown at 23 in Figure 2 adjacent the web 18 and the supply of cord is held, when not in use, between the winder brackets 24, one of which is carried on the connecting bracket 18 and the other of which is preferably carried on one or both of the handles 17. The motor, in the commercial form of the invention, has a conventional foot switch or hand switch, not shown, for conveniently controlling the supply of electric power. The free end of the cord 21 has a suitable electrical connection, also not shown, for connection to the usual electrical outlet receptacle.

The motor shaft 25 carries a driving pulley 26 which is spaced above the bottom 11 of the lower frame 10 and which drives a pulley 27 mounted on a shaft 28 by means of a flexible drive belt 26'. The shaft 28 is supported for rotation on the bottom frame 10, as will be later described.

Referring to Figure 2 and to Figure 4, the front edge of the bottom frame is cut away, shown at 28' and across this recess extends a block 29 illustrated in detail in Figure 3 and shown in position in Figures 1 to 4. The block is disposed between the sides 12 of the lower frame 10 and is adjustably held in position by means of bolts 30 as shown in Figure 1 which are slidable in the slots 31 in the sides 12, the said bolts engaging in the threaded recesses 32 in the ends of the block 29. In this manner the block may be adjusted longitudinally of the bottom frame 10, as well as be held in rigid position to support the shaft 28. In order to further secure the block in its operative position and to provide a means for adjusting the tension of the drive belt, suitable lugs 33 are formed on the inside surface of the sides 12 as shown in Figure 2 having threaded openings which receive bolts 34, the free ends of which can be brought home against the adjacent side of the block 29 to form a rigid supporting structure for the shaft 28.

The shaft 28 is rotatably mounted in the block 29 in any suitable manner whereby the pulley 27 can freely rotate and thereby rotate the shaft 28, to which any desired implement 36 is connected as shown in Figure 4 and which is particularly shown as a brush or polishing implement 36 in Figure 1. The shaft 28 in the particular embodiment shown in Figure 4 is mounted for free rotation in the block 29 by the use of a pair of bearing assemblies, and is fixed against longitudinal motion by the use of conventional collars. In the bearing construction, bearing race units 44 are positioned in suitable recesses shown in Figure 4 formed in the upper and lower faces of the block 29. These bearing units 44 are axially aligned and secured in position by set screws 29' as shown. If it is not desired to connect any implement such as 36 to the shaft 28 beneath the pulley 27 but to connect power transmission means such as a flexible shaft 38 to the shaft 28 this may be done in either of two ways. The flexible shaft 38 may be secured on the upper side of the pulley and block as shown in Figure 4 by extending the shaft 28 through the opening 39 of the block and providing it with a connection to the rotary flexible shaft 38. Alternately, the flexible shaft 38 may be secured to the implement receiving end of the shaft 28.

When the device is utilized as a source of power, the handles are depressed in a manner hereinafter described, and the center of gravity moves rearwardly to hold the device stationary whereby the flexible shaft 38 or other power take-off units and implements may be conveniently employed.

The bottom frame 10 is provided with an axle 40 welded thereto or otherwise secured as shown in 41, the ends of which extend beyond the bottom 11 and carry suitable wheels 42, whereby the whole device is made portable. The center of gravity of the construction is to the right of the axle 40 in Figure 4, but when it is desired to use the flexible shaft 38, the handles 17 can be tilted to pivot the structure upon the axle with the ends 43 of the handles in engagement with the floor or ground so as to shift the center of gravity to the left.

As explained above, probably any type of implement can be attached to the shaft 28 for doing all kinds of useful work and, as will be evident, innumerable devices can be operated from the flexible shaft 38. The construction is light, very simple in the number and arrangement of parts, and may be readily moved from one location to another. Furthermore, the recess 28' in the bottom 11 allows an operator to observe the work and thereby efficiently operate upon the same.

I wish it to be understood that I do not desire to be limited to the exact details of construction shown and described, for obvious modifications will occur to a person skilled in the art.

I claim:

A portable machine construction comprising a frame including a horizontal plate, forwardly converging side plates extending upwardly from said horizontal plate and a rear channel member extending upwardly from the rear edge of said horizontal plate above said side plate, upwardly and rearwardly extending handle means secured to said side plates and said rear channel member, a forwardly extending, vertically disposed motor carried by said rear channel member, a transversely extending bearing block mounted between the forward ends of said side plates for fore and aft adjustment, a shaft journaled in said bearing block and adapted to carry a rotary floor treating implement on the lower end thereof, said shaft extending vertically through an implement revealing recess in the forward end of said horizontal plate, belt and pulley means for drivingly connecting said motor to said shaft, and a wheeled transverse axle mounted below the rear portion of said horizontal plate in a position so as to dispose the center of gravity of the machine forward of said axle when the machine is in a floor treating position and rearward of said axle when the machine has been rotated about said axle into a stationary position supported by said handle means with said implement carrying shaft elevated to provide a power take-off.

References Cited in the file of this patent

UNITED STATES PATENTS

| Number | Name | Date |
|---|---|---|
| 877,954 | Schuttler | Feb. 4, 1908 |
| 1,192,830 | Kirby | July 25, 1916 |
| 1,591,282 | Cech | July 6, 1926 |
| 1,601,087 | Simpson | Sept. 28, 1926 |
| 2,312,972 | Orr | Mar. 2, 1943 |
| 2,490,870 | Heyn | Dec. 13, 1949 |
| 2,498,796 | Downer | Feb. 28, 1950 |